US010773369B2

(12) United States Patent
Sundberg et al.

(10) Patent No.: US 10,773,369 B2
(45) Date of Patent: Sep. 15, 2020

(54) FASTENER RETENTION DEVICE FOR A GUARD COVER

(71) Applicant: HUSQVARNA AB, Huskvarna (SE)

(72) Inventors: Niklas Sundberg, Alingsås (SE); Håkan Pinzani, Göteborg (SE); Andreas Backström, Göteborg (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/536,937

(22) PCT Filed: Dec. 22, 2014

(86) PCT No.: PCT/SE2014/051563
§ 371 (c)(1),
(2) Date: Jun. 16, 2017

(87) PCT Pub. No.: WO2016/105256
PCT Pub. Date: Jun. 30, 2016

(65) Prior Publication Data
US 2018/0215031 A1     Aug. 2, 2018

(51) Int. Cl.
*B25F 5/02* (2006.01)
*B23D 45/16* (2006.01)
(Continued)

(52) U.S. Cl.
CPC .............. *B25F 5/02* (2013.01); *B23D 45/16* (2013.01); *F16B 33/002* (2013.01);
(Continued)

(58) Field of Classification Search
CPC .......... B23D 45/16; B25F 5/02; F16B 33/002; F16B 41/002; F16B 43/00; F16B 5/02
(Continued)

(56) References Cited

U.S. PATENT DOCUMENTS 4,781,502 A * 11/1988 Kushnick ................ F16B 39/10
411/150
5,491,899 A * 2/1996 Schliemann ............ B27B 17/14
30/386
(Continued)

FOREIGN PATENT DOCUMENTS

CN       2181589 Y    11/1994
CN    104070561 A    10/2014
(Continued)

OTHER PUBLICATIONS

International Search Report and Written Opinion for International Application No. PCT/SE2014/051563 dated Sep. 15, 2015, all enclosed pages cited.

(Continued)

*Primary Examiner* — Ghassem Alie
*Assistant Examiner* — Bharat C Patel
(74) *Attorney, Agent, or Firm* — Burr & Forman, LLP

(57) ABSTRACT

A cover (30) for concealing one or more components (20) of a power tool (10) presented herein. The cover (30) can include a through recess (52) between an inner surface (702) and an outer surface (708). The through-recess (52) being arranged for receiving a threaded member (80) protruding from the tool (10) and extending between an inner opening (704) at the inner surface (702) and an outer opening (706) at the outer surface (708). A threaded nut (60) for engaging the threaded member (80) for tightening the cover (30) to the tool (10) can be included. Additionally, the threaded nut (60) can be attached to the cover (30). The nut (60) can include a radially protruding portion (70) with a larger radius than the inner opening (704) and outer opening (706). The cover (30) can have opposing first and second shoulder portions (712, 714) surrounding the inner opening (704) and outer opening (706).

10 Claims, 7 Drawing Sheets

(51) Int. Cl.
*F16B 33/00* (2006.01)
*F16B 41/00* (2006.01)
*F16B 43/00* (2006.01)
*F16B 5/02* (2006.01)

(52) U.S. Cl.
CPC ............ *F16B 41/002* (2013.01); *F16B 43/00* (2013.01); *F16B 5/02* (2013.01)

(58) Field of Classification Search
USPC .......................................................... 30/390
See application file for complete search history.

(56) References Cited

U.S. PATENT DOCUMENTS

| | | | | |
|---|---|---|---|---|
| 5,983,508 | A * | 11/1999 | Sundstrom | B27B 17/14 30/383 |
| 6,694,623 | B1 * | 2/2004 | Haughey | B27B 17/14 30/386 |
| 8,132,484 | B2 * | 3/2012 | Pfleiderer | B27B 17/02 30/383 |
| 8,413,645 | B2 | 4/2013 | Donnerdal et al. | |
| 8,615,889 | B2 * | 12/2013 | Martinsson | B27B 17/14 30/383 |
| 8,740,529 | B2 * | 6/2014 | Martinsson | B27B 17/14 411/353 |
| 8,869,787 | B2 * | 10/2014 | Tholking | B27B 17/02 125/12 |
| 9,109,727 | B1 * | 8/2015 | Madson | F16L 19/0218 |
| 9,393,712 | B2 * | 7/2016 | Yoneyama | B27B 17/02 |
| 2007/0180710 | A1 * | 8/2007 | Moore | B27B 9/00 30/391 |
| 2011/0232110 | A1 * | 9/2011 | Wolf | B27B 17/02 30/383 |
| 2014/0290074 | A1 * | 10/2014 | Takayanagi | B23D 57/023 30/382 |

FOREIGN PATENT DOCUMENTS

WO   2009048356  A1   4/2009
WO   2009111094  A1   9/2009

OTHER PUBLICATIONS

International Preliminary Report on Patentability for International Application No. PCT/SE2014/051563 dated Jun. 27, 2017, all enclosed pages cited.

* cited by examiner

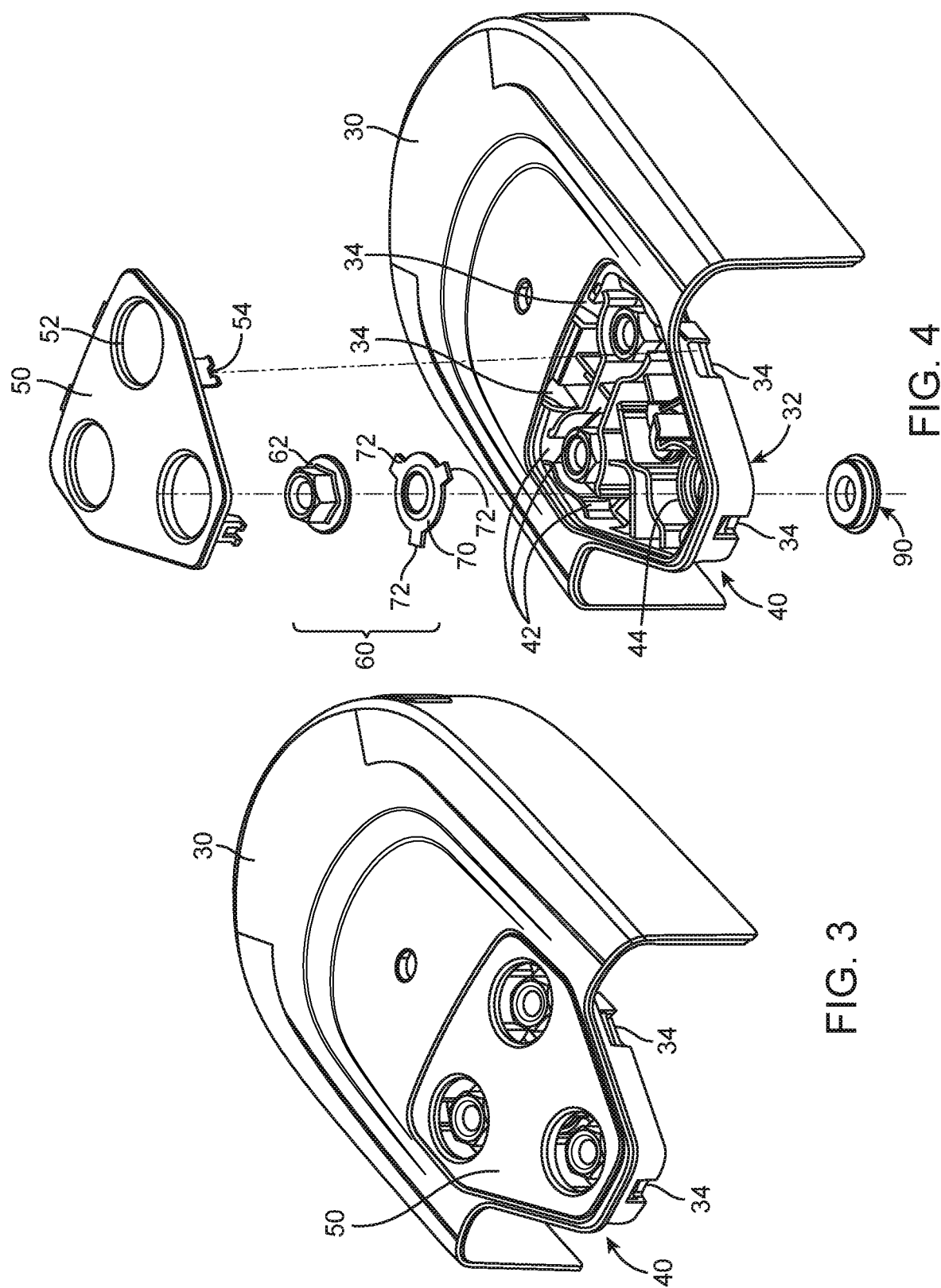

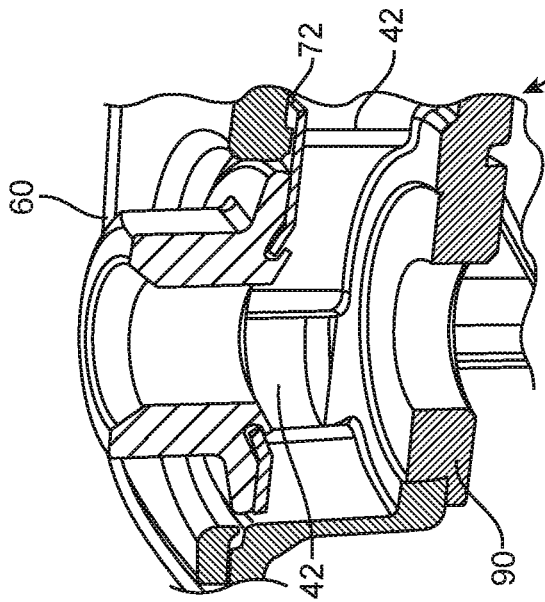
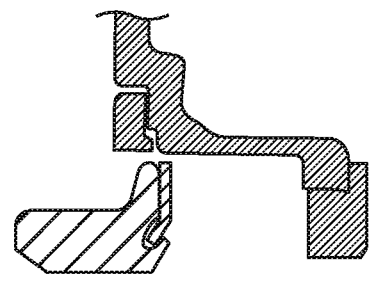
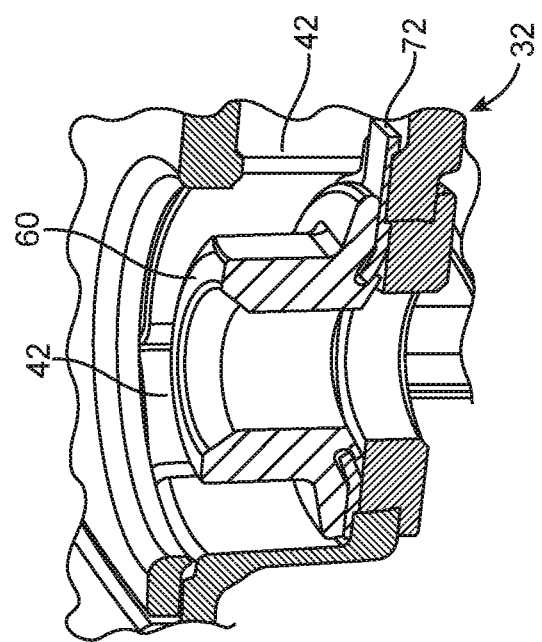
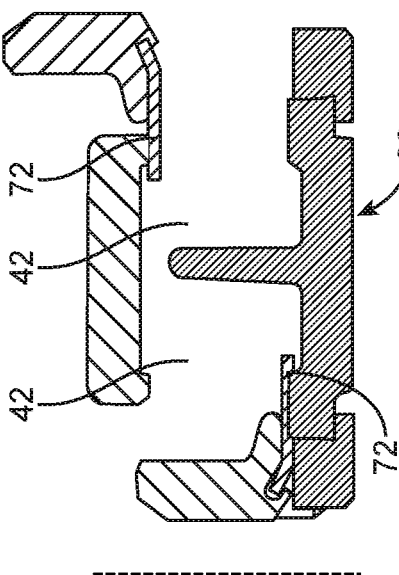
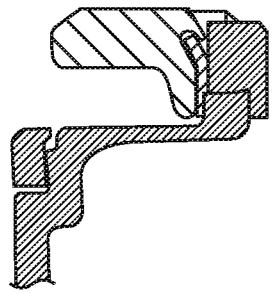
FIG. 8
FIG. 9
FIG. 10

US 10,773,369 B2

FASTENER RETENTION DEVICE FOR A GUARD COVER

FIELD

The subject matter herein generally relates to hand-held motor-driven tools. More specifically, the subject matter herein relates to saws with a guard cover that retains fasteners to the guard cover.

BACKGROUND

A saw can include one or more covers that are configured to be removed. In order to secure the cover to the saw, one or more fasteners can be included. The fasteners are configured to disengage from a portion of the saw to allow the cover to be removed. The cover can be configured to protect the operator from one or more moving components of the saw. Additionally, the cover can be configured to prevent objects from entering the portion of the saw that is protected by the cover. The fasteners allow the cover to be removed for servicing. In some cases, the servicing of the saw may be done on a frequent basis. In some instances, the cover needs to be removed while the saw is in the field rather than waiting until it is serviced in a shop.

BRIEF DESCRIPTION OF THE DRAWINGS

Implementations of the present technology will now be described, by way of example only, with reference to the attached figures, wherein:

FIG. 3 is a perspective view of a guard cover in accordance with an exemplary embodiment;

FIG. 4 is an exploded, perspective view of the guard cover in FIG. 3 in accordance with an exemplary embodiment;

FIG. 8 is a cross sectional view of a part of the guard cover in FIG. 3 without the engagement device in accordance with an exemplary embodiment;

FIG. 9 is a cross sectional view of a part of the guard cover in FIG. 3 without the engagement device in accordance with an exemplary embodiment;

FIG. 10 is a cross sectional view of the guard cover in FIG. 3 without the engagement device in accordance with an exemplary embodiment;

DETAILED DESCRIPTION

Figure 1:
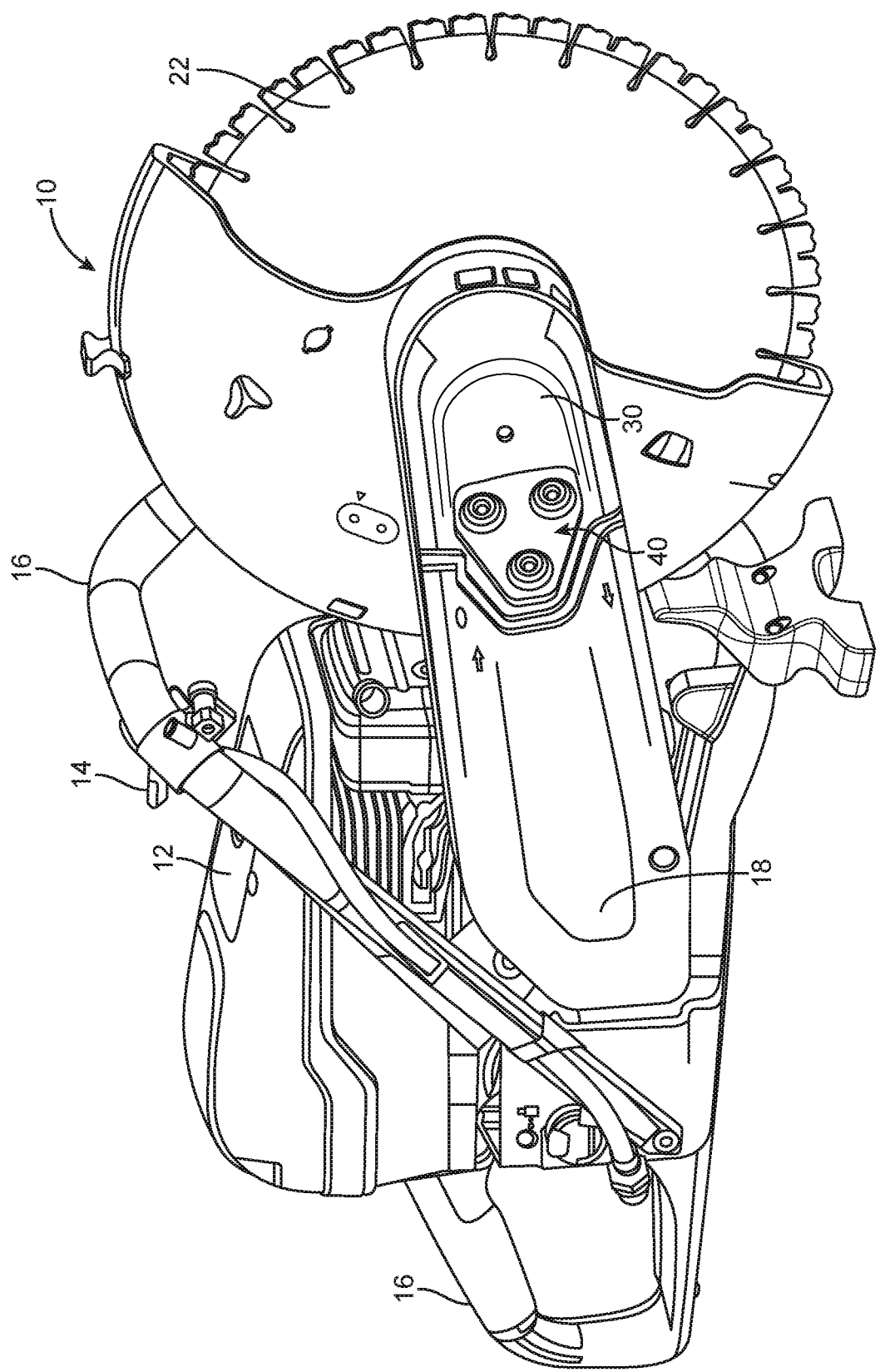
FIG. 1 is a perspective view of a saw in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure provides for retaining a fastener that can be loosened from an engagement device. For example, the engagement device can be a threaded member that extends to secure a cover. When a power tool includes a guard cover as described herein, the fasteners can be loosened from an installed configuration so that the guard cover can be removed. Additionally, the fasteners are retained by the guard cover to prevent the fasteners from becoming lost or misplaced. The retention device for the fasteners as presented herein includes a receiving portion and a retaining cover.

While the cover has been described as concealing one or more rotating components, the guard cover can be implemented for other reasons including a cover to shield brake components, a centrifugal clutch, or other portion such as an air filter of a tool. While the cover is generally described herein in relation to a saw, the present disclosure applies equally to other tools that have covers implemented therewith. The guard cover can also be configured to conceal an access area. The access area can be configured to provide access to a component of the power tool, oiling a saw blade, oiling a component of the tool, or a serviceable area, including an oil fill and a fuel fill.

The guard cover can further be configured to protect internal components from debris. The guard cover can also protect users from accidental contact with internal components.

The present disclosure relates generally to a power tool having a cover for concealing one or more components. The one or more components can include fuel lines, service areas, brake components, motor components or the like. In at least one example, a power tool can include multiple covers configured to cover a variety of portions of the tool.

The cover can have a through recess between an inner surface facing the one or more components and an outer surface facing away from the one or more components. The through recess can be arranged for receiving a threaded member, such as a bolt or screw or threaded stud, protruding from the tool and extending between an inner opening at the inner surface and an outer opening at the outer surface. A threaded nut for threadingly engaging the threaded member can allow the cover to be fastened to the tool. The nut can be captively attached to the cover and include a radially protruding portion having a larger radius than the inner and outer openings. The radially protruding portion can be a plurality of tabs or a continuous portion having a larger radius than the nut. In at least one example, the nut can include a plurality of radially protruding portions.

The cover can have opposing first and second shoulder portions surrounding the inner and outer openings. In the tightened state of the nut and threaded member, the nut can be configured to be in tight contact with the first shoulder portion. In the non-engaged state of the nut and threaded member, the radially protruding portion can engage with the second shoulder portion for captively attaching the nut to the cover. The distance between the first shoulder portion and the second shoulder portion can be configured to accommodate the nut in a disengaged state from the threaded member and remain captively attached to the cover. In at least one example, when in the disengaged state the nut can move freely between the first shoulder portion and the second portion.

The radially protruding portion can be in tight contact with the first shoulder portion when the nut is in an installed configuration. The radially protruding portion can be a washer and configured to at least partly protrude outward beyond a main fastening portion of the nut. The washer can have at least two radial protrusions extending radially outward beyond a main fastening portion of the nut. In at least one example, the washer can be rotatably attached to the main fastening portion of the nut. The washer can rotate freely and independent of the nut. In at least one example, the nut and washer can be coupled using a tongue and groove arrangement in which a bottom surface of the nut has a groove configured to receive a corresponding tongue portion of the washer. In an alternative example, the washer can be fixed to the main fastening portion of the nut. The radially protruding portion can be a flat washer and at least partially protrude outward beyond the main fastening portion of the nut.

The cover can further include another through recess formed between the inner surface and the outer surface of the cover. The another through recess can be configured to receive another threaded member, such as a bolt or screw or threaded stud, and another threaded nut for threadingly engaging the another threaded member. In at least one example, the cover can include a plurality of through recesses formed therein, each configured to receive a corresponding threaded member and threaded nut for threadingly engaging the corresponding threaded member. The number of threaded members and nuts can vary depending on the size of the cover, the arrangement of the cover, the size of the threaded member, the size of the nut, and other factors configured to ensure a secure arrangement between the cover and the power tool.

The present disclosure further provides for a saw configured to cut objects and having one or more rotating components for driving a saw blade or chain. The saw can include a guard cover configured to conceal at least one of the rotating components of the saw and a retaining cover configured to retain at least one fastener. The saw can include a motor coupled to the one or more rotating components. The rotating components can include, but are not limited to, drive mechanisms, pulleys, belts, gears, and springs. The one or more rotating components can be configured to drive the saw blade or chain. The motor can be combustion or electrical powered. The saw can further include a trigger assembly operably coupled to the motor and configured to allow a user to manage motor power output to the rotating components and rotations per minute (rpm) of the saw blade or chain. The saw blade or chain can be configured to cut objects as the motor powers the saw. While the illustrated embodiment presents a saw with a blade, the present disclosure contemplates the implementation of the saw with a chain saw. In at least one embodiment, the saw can be configured to alternatively accept either a blade or a chain saw.

The guard cover can have a receiving portion formed therein and can be configured to receive one or more fasteners, each having a radially protruding portion. The retaining cover can be configured to retain the radially protruding portion. The guard cover can include a receiving portion that can be configured to receive the one or more fasteners, each having a radially protruding portion and a retaining cover that can be configured to retain the radially protruding portion. The one or more fasteners can be configured to abut against the receiving portion in an installed configuration.

The radially protruding portion can be configured to extend beyond a main fastening portion of the fastener. In at least one example, the protruding portion can be a washer coupled to the fastener. In the illustrated embodiments discussed herein the protruding portion can be in the form of a washer. The washer can have multiple different types of configurations. For example, in one embodiment, the washer can be round and be such that the radius of the washer is substantially the same as that of the nut. In other embodiments, the radius of the washer can be greater than that of the nut. In other embodiments, such as the majority of the ones illustrated herein, the washer can further have protrusions that extend beyond its nominal circumference. The washer can be substantially circular, ovoid, or rectangular. In at least one example, the washer can be coupled to the main fastening portion via a tongue and groove arrangement. The washer can further have at least one protrusion extending radially outward beyond the main fastening portion. The protrusion can be received in the receiving portion formed in the guard cover. When the washer has more than one protrusion, each protrusion can have substantially the same length or alternatively each protrusion can have varying lengths. As the fastener is rotated to engage or disengage the engagement device, the protrusions can abut an extension arm restraining portion of the receiving portion, thereby preventing rotation of the washer independent of the fastener.

As indicated herein, when there is just one protruding portion, that protruding portion can include similar protrusions that are described above in relation to the washer. For example, the protruding portion can include one or more protrusions. The protrusions can number two or three in at least one or more embodiments.

The guard cover can have one, two, or three or more fasteners configured to secure the guard cover to the saw. The number of fasteners can depend on the location, size, and shape of the guard cover. The size of the saw, size of each fastener, and the necessary securement can further influence the number of fasteners to be implemented. In at least one example, the guard cover can be secured by one fastener. In another example, the guard cover can be secured by at least three fasteners. In at least one example, the guard cover can have at least three fasteners with the third fastener being offset from the first and second fasteners.

In at least one example, the protruding portion can be at least two protrusions that extend radially outward beyond the main fastening portion. When the protruding portion includes at least two protrusions, the protrusions can be offset from one another by at least two angles. The at least two angles can be substantially equal. In another example, the at least two angles can be different.

In at least one example, the protruding portion can include at least three protrusions that extend radially outward beyond the main fastening portion. The at least three protrusions can be offset from one another by at least three angles. The at least three angles can be substantially equal. In at least one example, the three protrusions can each be equally offset from one another such that a centerline of each protrusion is substantially one hundred and twenty degrees (120°) from centerlines of the two other protrusions. In another example, the three protrusions can be offset from one another by differing angles. The at least three angles can each be different from the one another, or two angles can be similar with the third angle being different. In at least one example, a first angle can be approximately one hundred and eighty degrees (180°) centerline to centerline, while the second and third angles can each be approximately ninety degrees (90°) centerline to centerline. Any combination of angles can be implemented depending on the design and configuration of the receiving portion and fastener.

The receiving portion can be configured to receive at least one fastener. The receiving portion can have one or more extension arm restraining portions formed therein. The one or more extension arm restraining portions can be configured to receive at least a portion of the fasteners. When more than one extension arm restraining portion is implemented, the angles formed between the extension arm restraining portions can correspond to the angles between the protrusions of each fastener. The extension arm restraining portions can be configured to receive the protrusion extending outwardly from the fastener.

The protruding portion can have more than one protrusion. The more than one protrusion can extend the same distance. In at least one example, at least one protrusion of two or more protrusions can have a length that is different. In other examples, each protrusion can have a different length and corresponding to an appropriate extension arm receiving portion. This arrangement can allow the fastener and protruding portion coupled thereto to be received in the receiving portion in only a single alignment. Alternatively, the protruding portion can have more than one protrusion each having the substantially the same length, and corresponding to any extension arm receiving portion. This arrangement can allow the fastener and protruding portion coupled thereto to be received in the receiving portion in numerous alignments.

The receiving portion can further include at least one pole configured to prevent the protruding portion from rotating. The pole can correspond to a protruding portion and extend therethrough. When the protruding portion includes protrusions, the pole can be configured to extend through the protrusion. The pole can be configured to work in conjunction with or independent of the extension arm restraining portion formed in the guard cover. The pole can experience a shear stress as the fastener is engaged and disengaged with the engagement device. The pole can also have an abutting portion that can retain the fastener within the receiving portion. The receiving portion can include a pole corresponding to each protrusion, or can have fewer poles. In at least one example, the receiving portion can include at least two poles corresponding to at least two protrusions. Each protrusion can be received in the extension arm restraining portion and have a pole extending therethrough. The poles can further restrain the protruding portion while allowing the main fastening portion to rotate freely. In at least one example, the at least one pole can be configured to restrain the protruding portion without the use of protrusions.

The retaining cover can have one or more through holes formed therein to allow a portion of the fasteners to extend therethrough. The through hole can be configured to receive an engagement tool configured to transition the fastener between an installed and uninstalled arrangement upon the engagement device. The receiving portion can be sized to allow the engagement tool to engage a portion of the fastener and freely rotate the fastener without contacting sidewalls. In at least one example, the fastener can be a hex head nut and the engagement tool can be a socket wrench, in which the through hole in the retaining cover is configured to allow the socket wrench to operate the nut without interference from the guard cover.

The receiving portion can have a depth to accommodate the full height of the fastener, such that in an installed configuration no portion of the fastener extends through the through holes. In an uninstalled configuration, the fastener, though captively held within the receiving portion, can move within the depth of the receiving portion. The receiving portion can be integrally formed with the guard cover.

The retaining cover can further include an engagement mechanism configured to secure the retaining cover to the guard cover. The engagement mechanism can prevent the retaining cover from separating from the guard cover without user interaction. In at least one example, the engagement mechanism can be a threadable connection for example, but not limited to, a screw or bolt. The screw or bolt can be engaged from a top surface of the retaining cover and extending and engaging into a portion of the receiving portion. In another example, the guard cover can include two or more engagement portions configured to engage with a corresponding attachment portion of the retaining cover. The attachment portions of the retaining cover can be outwardly extending tabs configured to be received in corresponding grooves in the guard cover. The tabs can have an end portion having a lip configured to catch on a corresponding section of the groove. The lip can ensure proper seating of the retaining cover.

The guard cover can have a bottom surface configured to receive at least one bushing. The bushing can be configured to act as a buffer between the guard cover and the saw. The bushing can be a rubber, soft plastic or other appropriate buffer material. The buffer can be configured to be user replaceable. In at least one embodiment, the bushing can be metallic or a metal. When the bushing is metallic or metal, the bushing can provide for increased strength, reduced fracturing, and robust surface for contact, while allowing for the cover to be lightweight. The guard cover can have a bushing at each through hole formed therein. The bushing can be press fit or integrally formed on the bottom surface of the guard cover. In another example, the bushing can be loosely positioned between the saw and the guard cover.

FIG. 1 illustrates a perspective view of a saw 10 in accordance with an exemplary embodiment. The saw 10 can be configured to cut objects and have one or more rotating components 20 (shown in FIG. 2) for driving a saw blade 22. The saw 10 can have a motor 12 coupled to the rotating components 20 and configured to power the saw blade 22. The motor 12 can be operably coupled to a trigger assembly 14 configured to control the power output from the motor 12 to the saw blade 22. The trigger assembly 14 can be positioned on a handle bar 16 located in front of and above the motor. In other examples, the trigger assembly 14 can be positioned on the handle bar 16 located directly behind the motor 12. The trigger assembly 14 can be configured to be operated by a user's hand or finger during operating while still allowing a steady grip of the saw 10.

The saw 10 can have a guard cover 30 configured to conceal a portion of an extension arm 18 of the saw 10. The guard cover 30 can also include a retaining cover 50 secured thereto. The guard cover 30 can be configured to protect internal components from dirt and debris, especially during operation of the saw 10. Along with protection from dirt and debris, the guard cover 30 can increase safe operation of the saw 10 by protecting the user from accidental contact with internal components including the rotating components. The guard cover 30 can be configured to be removed from the saw 10 to allow access to the internal components 20 when the saw is not in use.

Figure 2:
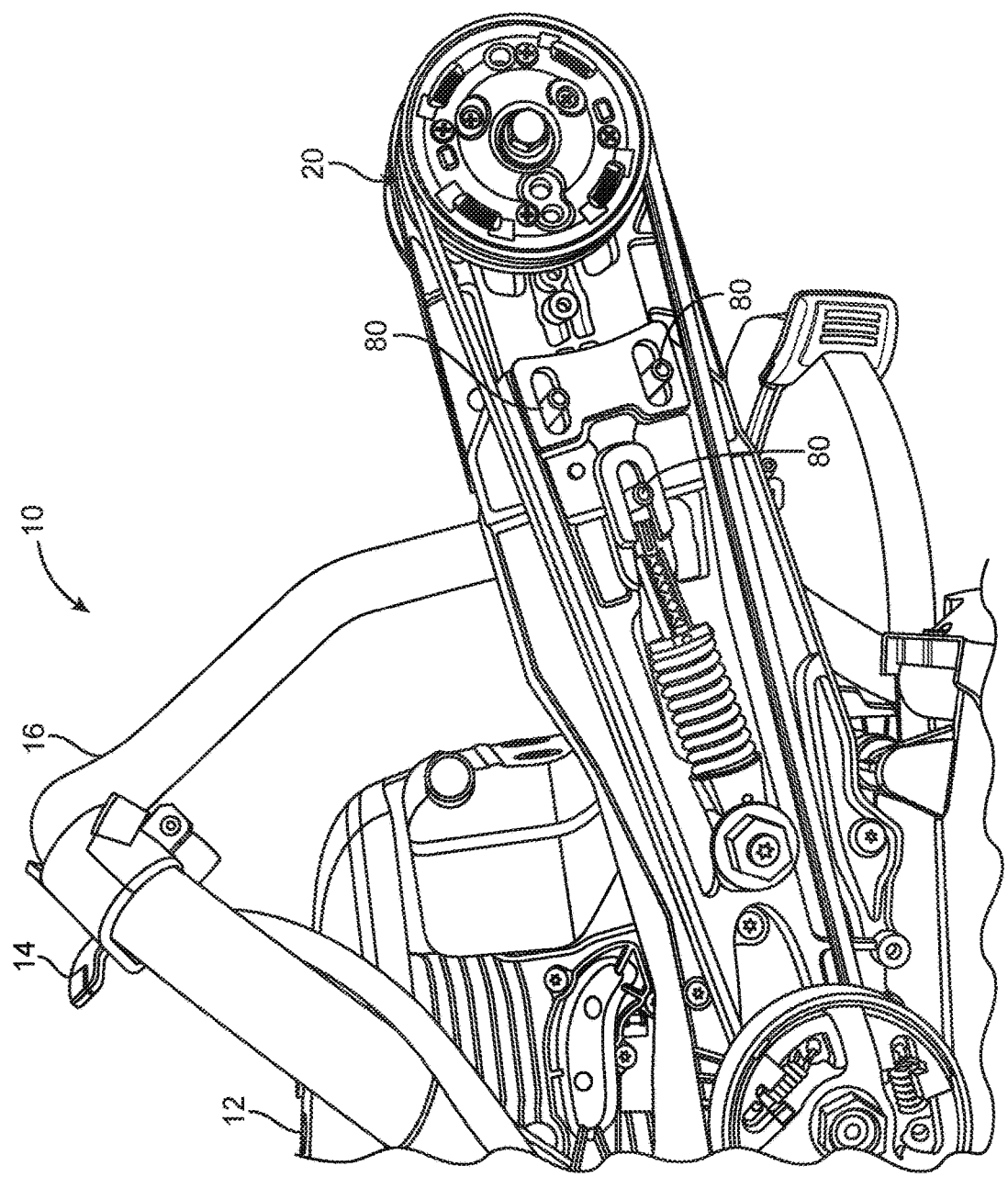
FIG. 2 is a perspective view of a saw having the guard cover removed in accordance with an exemplary embodiment.

FIG. 2 illustrates a perspective view of a saw 10 having the guard cover removed in accordance with an exemplary embodiment. With the guard cover 30 removed, the one or more rotating components 20 can be seen. The guard cover 30 can be secured to the saw 10 by coupling one or more fasteners (not shown) to one or more engagement devices 80. The engagement device 80 can be threaded studs extending from the extension arm 18 of the saw 10. The engagement device 80 can be securely attached to the saw 10, e.g. by means of force fit. In other embodiments, the engagement device 80 can be removably coupled to the saw 10. As can be appreciated in FIGS. 1 and 2, the guard cover can be secured using three engagement devices 80. While FIG. 2 illustrates an extension arm 18 having three engagement devices 80, it should be appreciated that any number of engagement devices 80 can be used.

FIGS. 3 and 4 illustrate the guard cover 30 in an assembled and exploded view, respectively, in accordance with an exemplary embodiment. The guard cover 30 can include a receiving portion 40 integrally formed therein and a retaining cover 50 configured to be removably attached to the guard cover 30. In at least one embodiment, when the retaining cover 50 is removed from the guard cover 30, the one or more fasteners can be removed from the receiving portion 40. In other examples, when the retaining cover 50 is removed from the guard cover 30, the one or more fasteners 60 are captively held within the receiving portion 40 by edge protrusions (shown in FIGS. 20 and 21).

The retaining cover 50 can be secured to the guard cover 30 using one or more attachment portions 54. The attachment portion 54 can be configured to engage with a corresponding engagement portion 34 formed in the receiving portion 40. The attachment portion 54 can have a lip configured to hook or otherwise catch onto a portion of the engagement portion 34, thereby preventing accidental separation of the retaining cover 50 from the guard cover 30. In at least one example, the attachment portion 54 can be a male engagement feature, such as a tab. The corresponding engagement portion 34 can be a female engagement feature, such as a tab receiver. In other examples, the retaining cover 50 can be secured to the guard cover 30 by a coupling device. The coupling device can include a threaded connection. In at least one example, the coupling device can be a bolt or threaded shaft.

The receiving portion 40 can be configured to receive one or more fasteners 60. The fasteners 60 can include a main fastening portion 62 and a protruding portion in the form of a washer 70. As indicated above, the protruding portion can take other forms than the washer that is illustrated. For example, the protruding portion can be another type of arrangement so long as a portion of the protruding portion extends beyond the main fastening portion 62.

When the protruding portion is implemented as a washer, the washer 70 can be configured to protrude beyond the main fastening portion 62. The washer 70 can be coupled to the main fastening portion 62 in such a way as to allow the main fastening portion 62 to rotate while the washer remains stationary. In at least one example, the main fastening portion 62 can be a nut. In at least one example the main fastening portion 62 and the washer 70 can be coupled using a tongue and groove arrangement. In this arrangement, the main fastening portion 62 can form a groove around the washer 70 such that each can freely rotate independent of the other.

The washer 70 can have one or more protrusions 72 extending radially outward and configured to prevent the fastener 60 from passing through the through hole 52 in the retaining cover 50. The receiving portion 40 can include extension arm restraining portions 42 configured to receive the one or more protrusions 72. As can be appreciated in FIG. 4, the washer 70 can have three protrusions 72 corresponding to three extension arm restraining portions 42. The protrusions 72 can abut the extension arm restraining portions 42, thereby preventing the washer 70 from rotating.

The receiving portion 40 can also include one or more through holes 44 configured to allow an engagement device 80 (seen in FIG. 2) to be received within the guard cover 30. The guard cover 30 can have a bottom surface 32 configured to receive a bushing 90. The bushing 90 can be configured to surround each of the one or more through holes 44 and act as a buffer between the guard cover 30 and the saw 10. In at least one example, the bushing 90 can be press fit into the guard cover 30. In other examples, the bushing 90 can be integrally formed into the guard cover 30.

The retaining cover 50 can have one or more through holes 52 formed therein. The one or more through holes 52 in the retaining cover 50 are configured to cover at least a portion of the receiving portion 40. The retaining cover 50 can be configured to conceal at least a portion of the receiving portion 40 and retain at least a portion of the one or more fasteners 60 within the receiving portion 40. In at least one example, the retaining cover 50 is configured to conceal the extension arm restraining portion 42 of the receiving portion 40. In other examples, the retaining cover is configured to conceal a portion of receiving portion 40 receiving a fastener 60 without protrusions 72.

The retaining cover 50 can have one, two, or more than three through holes 52. The quantity and location of through holes 52 in the retaining cover 50 can be configured to correspond to the arrangement of engagement devices 80 on the saw. As can be appreciated in FIGS. 3 and 4, the retaining cover can have three through holes 52. The through holes 52 can be configured to allow an engagement tool to access the fastener 60 and transition the fastener 60 between an installed configuration 500 and an uninstalled configuration 600. In at least one example, the engagement tool can be a socket wrench configured to install and uninstall the fastener 60.

Figure 5:
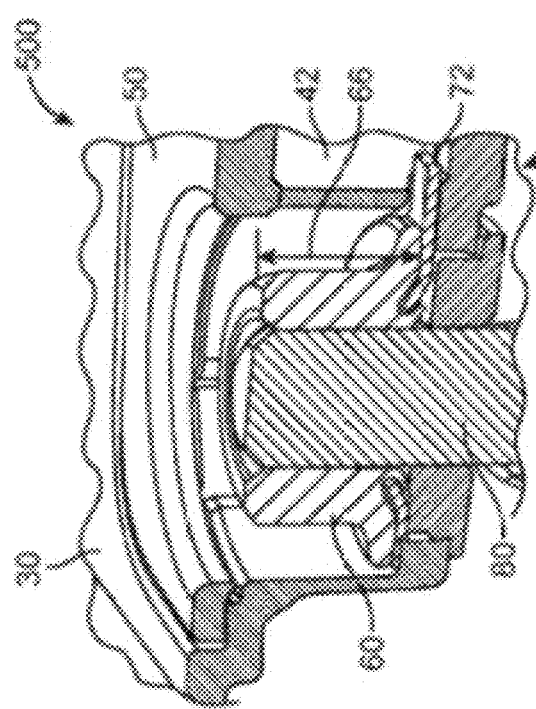
FIG. 5 is a cross sectional view of a part of the guard cover in FIG. 3 where a fastener is engaged with an engagement device in accordance with an exemplary embodiment.

As can be appreciated in FIG. 5, in the installed configuration 500, the fastener 60 can be secured to the engagement device 80, thereby securing the guard cover 30 to the saw 10. As the fastener 60 is tightened the washer 70 is held in place by the protrusion 72 abutting extension arm restraining portion 42.

Figure 6:
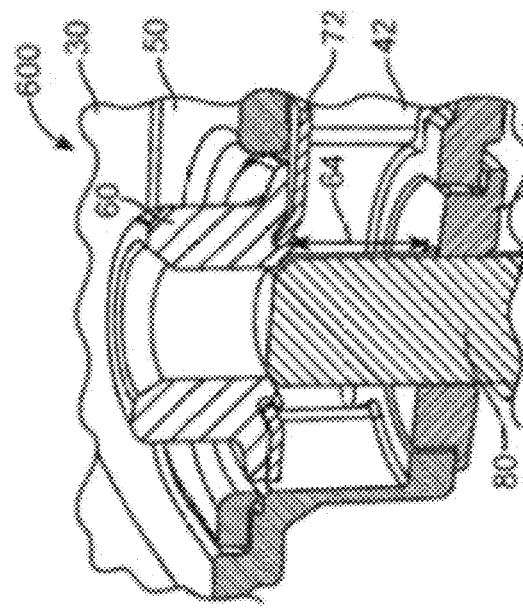
FIG. 6 is a cross sectional view of a part of the guard cover in FIG. 3 where the fastener is not engaged with the engagement device in accordance with an exemplary embodiment.

As can be appreciated in FIG. 6, in the uninstalled configuration 600 the fastener 60 can be disengaged from the engagement device 80. The fastener 60 can be configured so that the fastener is not capable of passing through the retaining cover 50 because the protrusion 72 abuts the bottom of the retaining cover 50. The full height 64 of the engagement portion 80 can be seen when the fastener 60 is in an uninstalled configuration 600.

Figure 7:
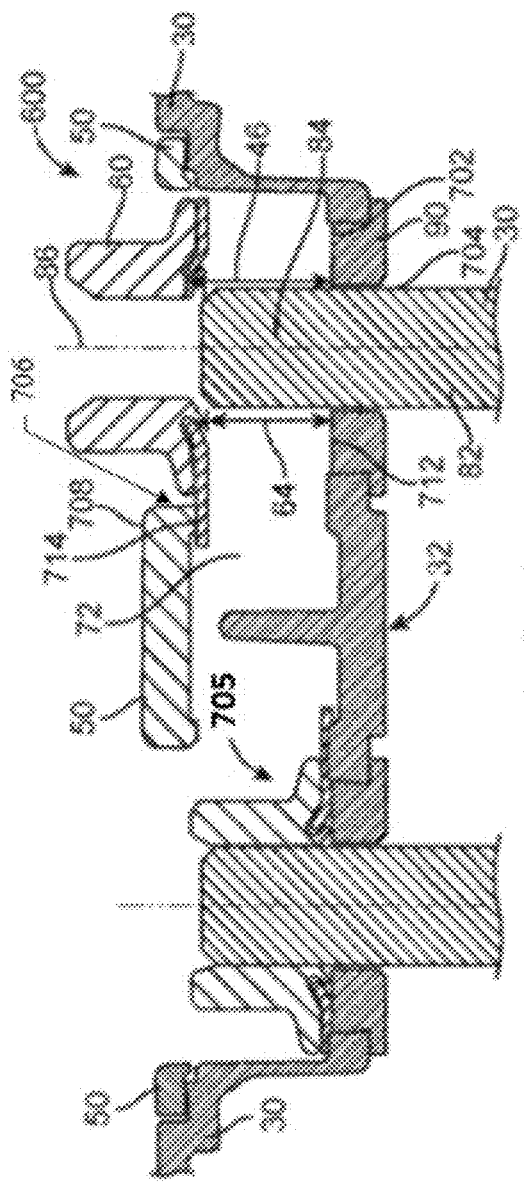
FIG. 7 is a cross sectional view of a part of the guard cover in FIG. 3 in accordance with an exemplary embodiment.

FIG. 7 illustrates two fasteners 60, one in an installed configured 500 and another in an uninstalled configured 600. The engagement device 80 can have a first part 82 and a second part 84. The first part 82 of the engagement device 80 can be defined as the portion of the engagement device outside of the guard cover 30. The first part 82 can include the portion of the engagement device 80 secured to the saw 10. In at least one example, the first part 82 of the engagement device 80 can be secured to the saw 10 by force fit. In other examples, the first part 82 of the engagement device 80 can be welded. The second part 84 of the engagement device 80 can be defined as the portion of the engagement device 80 that extends into the guard cover 30 and can be engaged by the fastener 60. In at least one example, the second part 84 of the engagement device 80 is threaded for engagement with fastener 60. In other examples, the second part 84 of the engagement device 80 can include a snap fit or other securing mechanism.

The depth 46 of the receiving portion 40 can allow the fastener 60 to travel within the receiving portion 40 when in an uninstalled configuration. When the fastener 60 is in an uninstalled configuration 600, the portion of the fastener larger than the through holes 52, abuts the underside of the retaining cover 50, thereby preventing the fastener 60 from being removed from the guard cover 30.

In an installed configuration 500, the depth 46 of the receiving portion 40 can accommodate the full height of the fastener 60, such that no portion of fastener 60 extends through the through hole 52 of the retaining cover 50 (shown in FIGS. 5 and 7). As the fastener 60 is transitioned between an installed configuration 500 and uninstalled configuration 600, the fastener 60 can be rotated about axis 86.

In the particular illustration, the engagement device 80 can be a bolt. Additionally, the fastener 60 can be a nut. As illustrated, a cover 30 for concealing one or more components of the power tool 10 is presented herein. The cover can include a receiving portion 40 as described above. In at least one embodiment, the receiving portion can be a through recess 705 between an inner surface 702 for facing the one or more components and an outer surface 708 for facing away from the one or more components. The through-recess 705 being arranged for receiving a threaded bolt 80 protruding from the tool and extending between an inner opening 704 at the inner surface 702 and an outer opening 706 at the outer surface 708. A threaded nut 60 for threadingly engaging the bolt 80 for tightening the cover 30 to the tool 10 can be included. Additionally, the threaded nut 60 can be captively attached to the cover 30. The nut 60 can include a radially protruding portion 70 with a larger radius than the inner opening 704 and outer opening 706. The cover 30 can have opposing first and second shoulder portions 712, 714 surrounding the inner opening 704 and outer opening 706. In the tightened state of the nut 60 and bolt 80, the nut 60 can be in tight contact with the first shoulder portion 712, and in the non-engaged state of the nut 60 and bolt 80, the radially protruding portion 70 is engagable with the second shoulder portion 714 for captively attaching the nut 60 to the cover 30.

Additionally, the radially protruding portion 70 can be in tight contact with the first shoulder portion 712 in a tightened state of the nut 60 and bolt 80. In at least one embodiment, the radially protruding portion 70 is a washer and at least partly protrudes outward beyond a main fastening portion 62 of the nut 60. In at least one embodiment, at least two radial protrusions 72 extending radially outward beyond a main fastening portion 62 of the nut 60. When a washer is provided, the washer can be rotatably attached to the main fastening portion 62 of the nut 60. The washer can be fixed to the main fastening portion 62 of the nut 60. The radially protruding portion 70 can be a flat washer and at least partly protrudes outward beyond a main fastening portion 62 of the nut 60. As illustrated the cover can include another through recess 705 formed between the inner surface 702 and the outer surface 708 of the cover 30. The another through recess 705 can be configured to receive another threaded bolt 80. Another threaded nut 60 can be included for threadingly engaging the another bolt 80. A distance 64 can formed between the first shoulder portion 712 and the second shoulder portion 714 accommodates the nut 60 to be disengaged from the threaded bolt 80 and remain captively attached to the cover 30.

Similarly, FIGS. 8-10 illustrate the guard cover 30 and fasteners 60 when the engagement device 80 is removed. This arrangement represents the guard cover 30 when uninstalled from the saw. In this arrangement, the fasteners 60 are retained within the receiving portion 40 by the retaining cover 50 because the retaining cover 50 conceals at least a portion of the receiving portion 40. As shown, when the engagement device 80 is removed the fasteners 60 are captively held within the receiving portion 40 because the protrusions 72 are unable to pass through the through holes 52 in the retaining cover 50.

While specific main fastening portion 62 and washer 70 arrangements have been discussed above with respect to saw 10, the fastener 60, washer 70, and protrusions 72 can take numerous sizes, shapes and configurations so long as the fastener 60 is configured to be retained within the receiving portion 40 when the guard cover 30 is in an uninstalled configuration 600.

Figure 11:
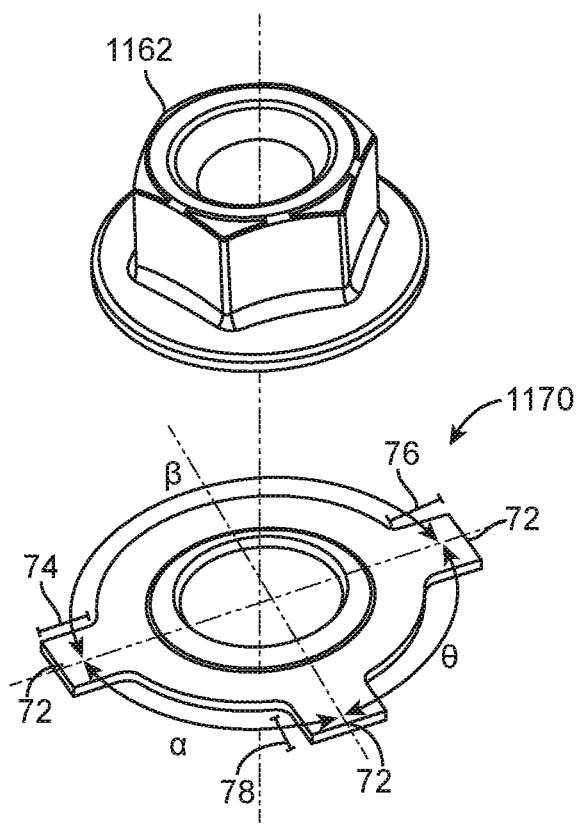
FIG. 11 is an exploded view of a first embodiment of a fastener in accordance with an exemplary embodiment.
Figure 12:
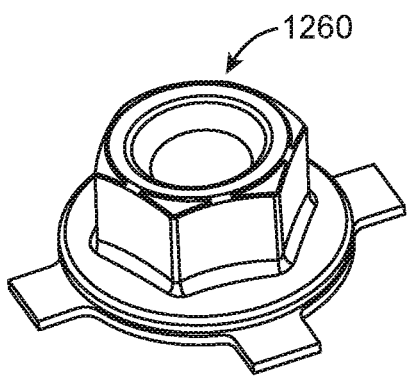
FIG. 12 is an assembled perspective view of a first embodiment of a fastener in accordance with an exemplary embodiment.

FIGS. 11 and 12 illustrate an exploded and assembled view, respectively, of a first embodiment of a fastener 1260. The fastener 1260 can include a main fastening portion 1162 and a washer 1170. The washer 1170 can have one or more protrusions 72 extending away from the main body of the washer 1170. Each protrusion can have a length 74, 76, 78. The length 74, 76, 78 of the each protrusion 72 can be uniform. In other embodiments, the lengths 74, 76, 78 can be each be different or any combination thereof. When each flange protrusion 72 is the same length, then the fastener 60 can be inserted in any orientation. However, the protrusions 72 can have different lengths requiring specific orientations. Protrusions 72 with differing lengths can require the fastener 60 to be inserted in a single orientation, or a few orientations depending on the number of varying lengths used for the protrusions 72. As may be appreciated by FIGS. 11 and 12, the washer 70 can have three protrusions 72 extending away from the main body of the washer. In at least one example, the washer 1170 can have more three protrusions 72 extending away from the main body of the washer 1170. More protrusions 72 can lead to a stronger fixation, but can increase complexity and manufacturing costs. One or two protrusions 72 can prevent the washer 1170 from rotating while saving space, maintaining alignment of the fastener 1162, but can also limit configurations and have a lower fixation strength.

When two or more protrusions 72 are provided, an angle can be formed between the two or more protrusions. The angle that is formed can be based on the configuration of the saw, the guard cover and/or engagement devices. As illustrated in FIGS. 11 and 12, the protrusions 72 can be offset from one another by three angles α, β, θ. The angles α and θ can be substantially similar, while angle β can be different. In at least one example, angles α and θ can be substantially 90 degrees measured centerline to centerline while angle β can be substantially 180 degrees centerline to centerline. This arrangement of protrusions 72 can further limit the orientations in which the fastener 1260 can be received in the receiving portion 40.

Figure 13:
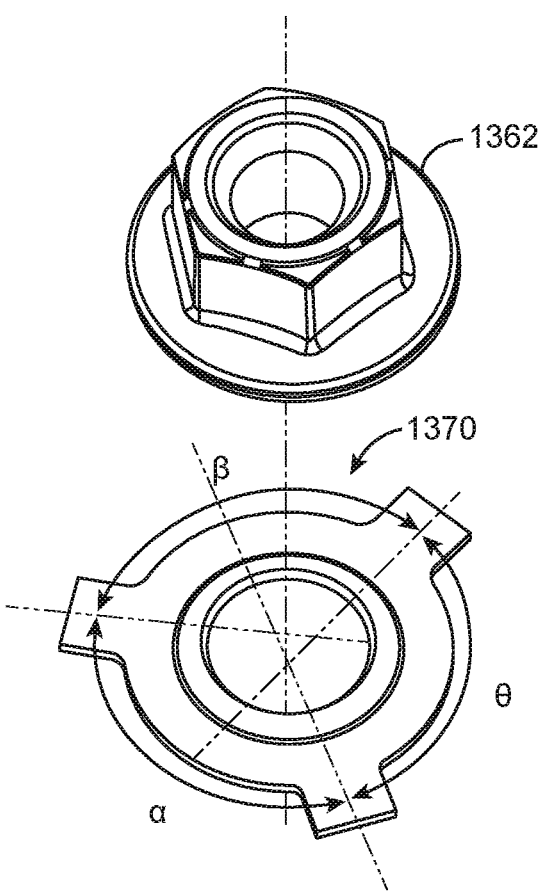
FIG. 13 is an exploded view of a second embodiment of a fastener in accordance with an exemplary embodiment.
Figure 14:
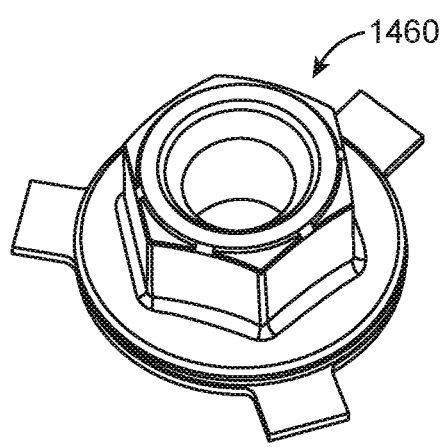
FIG. 14 is an assembled perspective view of a second embodiment of a fastener in accordance with an exemplary embodiment.

FIGS. 13 and 14 illustrate an exploded and assembled view, respectively, of a second embodiment of a fastener 1460. The fastener 1460 can include a main fastening portion 1362 and a washer 1370. The washer 1370 can include three protrusions 72 forming three angles α, β, θ. As can be appreciated in FIGS. 11 and 12, the angles α, β, and θ can be substantially similar. In the illustrated example, angles α, β, and θ can be substantially 120 degrees measured centerline to centerline. In this arrangement, the angles do not limit the orientations in which fastener 1460 can be received in the receiving portion 40.

Figure 15:
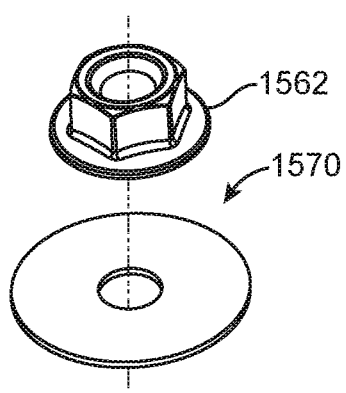
FIG. 15 is an exploded view of a third embodiment of a fastener in accordance with an exemplary embodiment.
Figure 16:
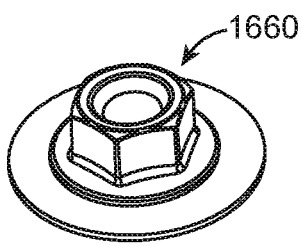
FIG. 16 is an assembled perspective view of a third embodiment of a fastener in accordance with an exemplary embodiment.

FIGS. 15 and 16 illustrate exploded and assembled view, respectively, of a third embodiment of a fastener 1660. The fastener 1660 can include a main fastening portion 1562 and a washer 1570. The washer 1570 can be substantially circular having no protrusions. This arrangement can prevent the fastener 1660 from requiring a specific orientation, while still also allowing the fastener 1660 to be retained by the retaining cover 50. In another example, the main fastening portion 1562 and washer 1570 can be a single piece. In this arrangement, the fastener 1660 has an extended flange section with the flange section not configured to rotate independent of the main fastening portion 1562.

Figure 19:
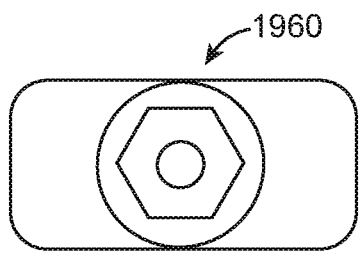
FIG. 19 is a top view of a sixth embodiment of a fastener in accordance with an exemplary embodiment.
Figure 17:
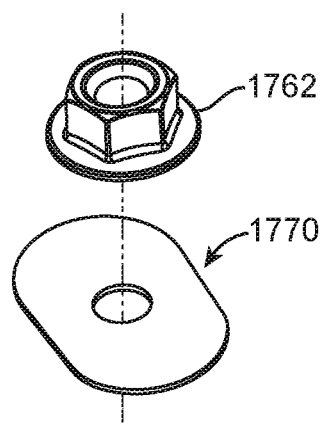
FIG. 17 is an exploded view of a fourth embodiment of a fastener in accordance with an exemplary embodiment.
Figure 18:
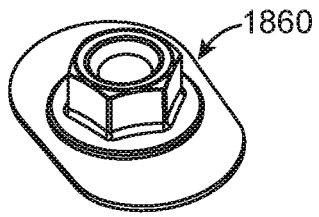
FIG. 18 is an assembled view of a fifth embodiment of a fastener in accordance with an exemplary embodiment.

FIGS. 17 and 18 illustrate and exploded and assembled view, respectively, of a fourth embodiment of a fastener 1860. The fastener 1860 can include a main fastening portion 1762 and a washer 1770. The washer 1770 can be ovoid having two rounded ends with two straight edges. This arrangement can provide some limitation as to the orientation, but also provide substantial freedom with orientation as compared with the previously discussed arrangements. As can be appreciated in FIG. 19, the fastener 1960 can include a washer having a substantially rectangular shape with rounded corners.

Figure 20:
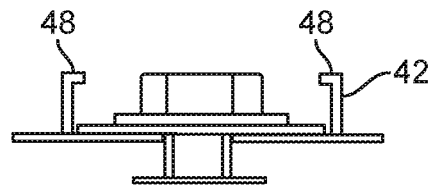
FIG. 20 is a diagrammatic illustration of the first embodiment of a fastener secured with edge protrusions in an installed configuration in accordance with an exemplary embodiment.
Figure 21:
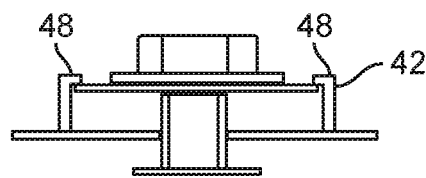
FIG. 21 is a diagrammatic of the first embodiment of a fastener secured with edge protrusions in an uninstalled configuration in accordance with an exemplary embodiment.

FIGS. 20 and 21 illustrate a cross sectional view of the fastener 60 secured with edge protrusions. The receiving portion 40 can further include one or more edge protrusions 48 configured to restrain movement of the washer 70 within the receiving portion 40. The edge protrusions 48 can be configured to retain the fastener 60 within the receiving portion 40 without the assistance of the retaining cover 50. In this arrangement, the retaining cover 50 can be omitted.

Figure 22:
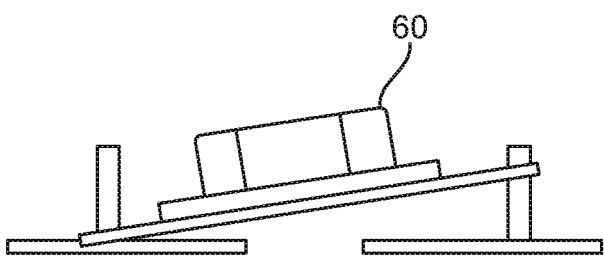
FIG. 22 is a diagrammatic view of the first embodiment of a fastener in accordance with an exemplary embodiment.

FIG. 22 illustrates a cross sectional view of the fastener 60 in accordance with an exemplary embodiment. As can be appreciated in FIG. 22, the retaining cover 50 is removed from the guard cover 30 allowing the fastener 60 to be removed from the receiving portion. The fastener can move at various angles due to the depth of the receiving portion.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms use in the claims.

What is claimed is:

1. A saw comprising:
    a guard cover for concealing one or more components of the saw and comprising a through-recess arranged for receiving a threaded member protruding from the saw;
    a retaining cover removably attached to the guard cover and comprising a through hole; and
    a threaded nut having a threaded portion extending from a first portion to a second portion of the threaded nut, the threaded nut configured to threadingly engage the threaded member for tightening the guard cover to the saw, the threaded nut comprising a radially protruding portion with a larger radius than a radius of the through hole of the retaining cover, the radially protruding portion radially protruding from the second portion of the threaded nut;
    wherein the through-recess of the guard cover has a depth defined between a bottom surface of the guard cover and an interior surface of the retaining cover to accommodate a height of the threaded nut such that no portion of the threaded nut extends through the through hole of the retaining cover when the threaded nut is in a tightened state with the threaded member, and
    wherein in a non-engaged state of the threaded member and the threaded nut, the radially protruding portion prevents the threaded nut from passing through the through hole of the retaining cover thereby preventing the threaded nut from being removed from the through-recess of the guard cover.

2. The saw as recited in claim 1, wherein the radially protruding portion has two radial protrusions radially protruding from the second portion of the threaded nut.

3. The saw as recited in claim 2, wherein the through-recess forms extension arm restraining portions configured to receive a corresponding one of the two radial protrusions, thereby holding the two radial protrusions substantially in place to prevent rotation thereof.

4. The saw as recited in claim 1, further comprising another through-recess defined between the bottom surface of the guard cover and the interior surface of the retaining cover and configured to receive another threaded member and another threaded nut for threadingly engaging the another threaded member.

5. The saw as recited in claim 1, wherein the radially protruding portion is coupled to the threaded nut via a recess in the second portion of the threaded nut.

6. A power tool comprising:
a blade or a chain saw;
a guard cover for concealing one or more components of the power tool configured to drive the blade or the chain saw and comprising a through-recess arranged for receiving a threaded member protruding from the power tool;
a retaining cover removably attached to the guard cover and comprising a through hole; and
a threaded nut having a threaded portion extending from a first portion to a second portion of the threaded nut, the threaded nut configured to threadingly engage the threaded member for tightening the guard cover to the power tool, the threaded nut comprising a radially protruding portion with a larger radius than a radius of the through hole of the retaining cover, the radially protruding portion radially protruding from the second portion of the threaded nut;
wherein the through-recess of the guard cover has a depth defined between a bottom surface of the guard cover and an interior surface of the retaining cover to accommodate a height of the threaded nut such that no portion of the threaded nut extends through the through hole of the retaining cover when the threaded nut is in a tightened state with the threaded member, and
wherein in a non-engaged state of the threaded member and the threaded nut, the radially protruding portion prevents the threaded nut from passing through the through hole of the retaining cover thereby preventing the threaded nut from being removed from the through-recess of the guard cover.

7. The tool as recited in claim 6, wherein the radially protruding portion has two radial protrusions radially protruding from the second portion of the threaded nut.

8. The tool as recited in claim 7, wherein the through-recess forms extension arm restraining portions configured to receive a corresponding one of the radial protrusions, thereby holding the two radial protrusions substantially in place to prevent rotation thereof.

9. The tool as recited in claim 6, further comprising another through recess defined between the bottom surface of the guard cover and the interior surface of the retaining cover and configured to receive another threaded member and another threaded nut for threadingly engaging the another threaded member.

10. The tool as recited in claim 6, wherein the radially protruding portion is coupled to the threaded nut via a recess in the second portion of the threaded nut.

* * * * *